US008724702B1

(12) United States Patent
Bulusu et al.

(10) Patent No.: US 8,724,702 B1
(45) Date of Patent: May 13, 2014

(54) METHODS AND SYSTEMS FOR MOTION ESTIMATION USED IN VIDEO CODING (75) Inventors: Ravi Bulusu, Santa Clara, CA (US); Rohit Puri, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1316 days.

(21) Appl. No.: 11/394,031

(22) Filed: Mar. 29, 2006

(51) Int. Cl.
H04N 7/12 (2006.01)

(52) U.S. Cl.
USPC ............ 375/240.16; 375/240.01; 375/240.12; 375/240.17; 375/240.29

(58) Field of Classification Search
USPC ............. 375/240.16, 240.01, 240.12, 240.29
See application file for complete search history.

(56) References Cited

U.S. PATENT DOCUMENTS

| | | |
|---|---|---|
| 3,679,821 A | 7/1972 | Schroeder |
| 4,177,514 A | 12/1979 | Rupp |
| 4,583,164 A | 4/1986 | Tolle |
| 4,591,979 A | 5/1986 | Iwashita |
| 4,644,461 A | 2/1987 | Jennings |
| 4,755,810 A | 7/1988 | Knierim |
| 4,814,978 A | 3/1989 | Dennis |
| 4,992,857 A | 2/1991 | Williams |
| 5,045,940 A | 9/1991 | Peters et al. |
| 5,130,797 A | 7/1992 | Murakami et al. |
| 5,146,324 A | 9/1992 | Miller et al. |
| 5,212,742 A | 5/1993 | Normile et al. |
| 5,225,875 A | 7/1993 | Shapiro et al. |
| 5,233,689 A | 8/1993 | Rhoden et al. |
| 5,267,334 A | 11/1993 | Normille et al. |
| 5,267,344 A | 11/1993 | Nelson, III |
| 5,369,744 A | 11/1994 | Fukushima et al. |
| 5,371,896 A | 12/1994 | Gove et al. |
| 5,596,369 A | 1/1997 | Chau |
| 5,598,514 A | 1/1997 | Purcell et al. |
| 5,608,652 A | 3/1997 | Astle |
| 5,613,146 A | 3/1997 | Gove et al. |
| 5,623,311 A | 4/1997 | Phillips et al. |
| 5,630,033 A | 5/1997 | Purcell et al. |
| 5,646,692 A | 7/1997 | Bruls |
| 5,657,465 A | 8/1997 | Davidson et al. |
| 5,768,429 A | 6/1998 | Jabbi et al. |
| 5,790,881 A | 8/1998 | Nguyen |
| 5,809,538 A | 9/1998 | Pollmann et al. |
| 5,821,886 A | 10/1998 | Son |
| 5,845,083 A | 12/1998 | Hamadani et al. |
| 5,870,310 A | 2/1999 | Malladi |

(Continued)

FOREIGN PATENT DOCUMENTS

| | | |
|---|---|---|
| CN | 1489391 | 4/2004 |
| EP | 1283640 | 2/2003 |

(Continued)

OTHER PUBLICATIONS

"Ralf Schafer et al.,", "H.264/AVC", Dated: Jan. 2003, pp. 1-12.

(Continued)

Primary Examiner — Dhaval Patel (57) ABSTRACT

A framework for efficient sum of absolute difference (SAD) computations for variable block size, sub-pixel motion estimation is presented. Simultaneous, or parallelized, SAD computations can be performed by storing and re-using previous SAD computational information, which can speed up the performance of a motion estimation module by reducing the number of cycles necessary to perform a particular motion estimation algorithm.

31 Claims, 7 Drawing Sheets

(56) References Cited

U.S. PATENT DOCUMENTS

| | | | |
|---|---|---|---|
| 5,883,823 A | 3/1999 | Ding | |
| 5,889,949 A | 3/1999 | Charles | |
| 5,898,881 A | 4/1999 | Miura et al. | |
| 5,909,224 A | 6/1999 | Fung | |
| 5,923,375 A | 7/1999 | Pau | |
| 5,954,786 A | 9/1999 | Volkonsky | |
| 5,969,728 A | 10/1999 | Dye et al. | |
| 5,999,220 A | 12/1999 | Washino | |
| 6,035,349 A | 3/2000 | Ha et al. | |
| 6,073,185 A | 6/2000 | Meeker | |
| 6,088,355 A | 7/2000 | Mills et al. | |
| 6,098,174 A | 8/2000 | Baron et al. | |
| 6,104,470 A | 8/2000 | Streefkerk et al. | |
| 6,144,362 A | 11/2000 | Kawai | |
| 6,148,109 A | 11/2000 | Boon et al. | |
| 6,157,751 A | 12/2000 | Olson et al. | |
| 6,175,594 B1 | 1/2001 | Strasser et al. | |
| 6,188,799 B1 | 2/2001 | Tan et al. | |
| 6,195,389 B1 | 2/2001 | Rodriguez et al. | |
| 6,222,883 B1 | 4/2001 | Murdock et al. | |
| 6,269,174 B1 | 7/2001 | Koba et al. | |
| 6,272,281 B1 | 8/2001 | De Vos et al. | |
| 6,305,021 B1 | 10/2001 | Kim | |
| 6,311,204 B1 | 10/2001 | Mills | |
| 6,317,124 B2 | 11/2001 | Reynolds | |
| 6,356,945 B1 | 3/2002 | Shaw et al. | |
| 6,360,234 B2 | 3/2002 | Jain et al. | |
| 6,418,166 B1 | 7/2002 | Wu et al. | |
| 6,459,738 B1 | 10/2002 | Wu et al. | |
| 6,539,060 B1 | 3/2003 | Lee et al. | |
| 6,539,120 B1 | 3/2003 | Sita et al. | |
| 6,560,629 B1 | 5/2003 | Harris | |
| 6,647,062 B2 | 11/2003 | Mackinnon | |
| 6,665,346 B1 | 12/2003 | Lee et al. | |
| 6,687,788 B2 | 2/2004 | Vorbach et al. | |
| 6,690,835 B1 | 2/2004 | Brockmeyer et al. | |
| 6,690,836 B2 | 2/2004 | Natarajan et al. | |
| 6,708,246 B1 | 3/2004 | Ishihara et al. | |
| 6,721,830 B2 | 4/2004 | Vorbach et al. | |
| 6,751,721 B1 | 6/2004 | Webb, Jr. et al. | |
| 6,760,478 B1 | 7/2004 | Adiletta et al. | |
| 6,782,052 B2 | 8/2004 | Sun et al. | |
| 6,799,192 B1 | 9/2004 | Handley | |
| 6,807,317 B2 | 10/2004 | Mathew et al. | |
| 6,823,443 B2 | 11/2004 | Horiyama et al. | |
| 6,950,473 B2 | 9/2005 | Kim et al. | |
| 6,996,645 B1 | 2/2006 | Wiedenman et al. | |
| 7,038,687 B2 | 5/2006 | Booth, Jr. et al. | |
| 7,173,631 B2 | 2/2007 | Anderson | |
| 7,260,148 B2 | 8/2007 | Sohm | |
| 7,277,101 B2 | 10/2007 | Zeng | |
| 7,289,672 B2 | 10/2007 | Sun et al. | |
| 7,379,501 B2 * | 5/2008 | Lainema | 375/240.29 |
| 7,403,564 B2 | 7/2008 | Laksono | |
| 7,450,640 B2 | 11/2008 | Kim et al. | |
| 7,499,491 B2 | 3/2009 | Lee et al. | |
| 7,548,586 B1 | 6/2009 | Mimar | |
| 7,548,596 B2 | 6/2009 | Yen et al. | |
| 7,551,671 B2 | 6/2009 | Tyldesley et al. | |
| 7,565,077 B2 | 7/2009 | Rai et al. | |
| 7,581,182 B1 | 8/2009 | Herz | |
| 7,630,097 B2 | 12/2009 | Kodama et al. | |
| 7,689,000 B2 | 3/2010 | Kazama | |
| 7,693,219 B2 * | 4/2010 | Yan | 375/240.16 |
| 7,720,311 B1 | 5/2010 | Sriram | |
| 7,721,069 B2 | 5/2010 | Ramchandran et al. | |
| 7,924,923 B2 | 4/2011 | Lee et al. | |
| 8,009,923 B2 * | 8/2011 | Li et al. | 382/236 |
| 8,369,402 B2 | 2/2013 | Kobayashi et al. | |
| 2001/0020941 A1 | 9/2001 | Reynolds | |
| 2001/0024448 A1 | 9/2001 | Takase et al. | |
| 2001/0028353 A1 | 10/2001 | Cheng | |
| 2001/0028354 A1 | 10/2001 | Cheng et al. | |
| 2002/0015445 A1 | 2/2002 | Hashimoto | |
| 2002/0015513 A1 | 2/2002 | Ando et al. | |
| 2002/0025001 A1 | 2/2002 | Ismaeil et al. | |
| 2002/0041626 A1 | 4/2002 | Yoshioka et al. | |
| 2002/0109790 A1 | 8/2002 | Mackinnon | |
| 2002/0114394 A1 | 8/2002 | Ma | |
| 2002/0118743 A1 | 8/2002 | Jiang | |
| 2003/0020835 A1 | 1/2003 | Petrescu | |
| 2003/0048361 A1 | 3/2003 | Safai | |
| 2003/0078952 A1 | 4/2003 | Kim et al. | |
| 2003/0141434 A1 | 7/2003 | Ishikawa et al. | |
| 2003/0161400 A1 | 8/2003 | Dinerstein et al. | |
| 2004/0057523 A1 | 3/2004 | Koto et al. | |
| 2004/0095998 A1 | 5/2004 | Luo et al. | |
| 2004/0100466 A1 | 5/2004 | Deering | |
| 2004/0150841 A1 | 8/2004 | Lieberman et al. | |
| 2004/0156435 A1 | 8/2004 | Itoh et al. | |
| 2004/0174998 A1 | 9/2004 | Youatt et al. | |
| 2004/0181564 A1 | 9/2004 | MacInnis et al. | |
| 2004/0181800 A1 | 9/2004 | Rakib et al. | |
| 2004/0190613 A1 | 9/2004 | Zhu et al. | |
| 2004/0190617 A1 | 9/2004 | Shen et al. | |
| 2004/0202245 A1 | 10/2004 | Murakami et al. | |
| 2004/0213348 A1 | 10/2004 | Kim et al. | |
| 2004/0218626 A1 | 11/2004 | Tyldesley et al. | |
| 2004/0218675 A1 | 11/2004 | Kim et al. | |
| 2004/0228415 A1 | 11/2004 | Wang | |
| 2004/0257434 A1 | 12/2004 | Davis et al. | |
| 2005/0008254 A1 | 1/2005 | Ouchi et al. | |
| 2005/0033788 A1 | 2/2005 | Handley | |
| 2005/0047502 A1 | 3/2005 | McGowan | |
| 2005/0066205 A1 | 3/2005 | Holmer | |
| 2005/0079914 A1 | 4/2005 | Kaido et al. | |
| 2005/0105618 A1 | 5/2005 | Booth et al. | |
| 2005/0123040 A1 | 6/2005 | Bjontegard | |
| 2005/0190976 A1 | 9/2005 | Todoroki et al. | |
| 2005/0238102 A1 | 10/2005 | Lee et al. | |
| 2005/0238103 A1 | 10/2005 | Subramaniyan et al. | |
| 2005/0265447 A1 | 12/2005 | Park | |
| 2005/0265454 A1 | 12/2005 | Muthukrishnan et al. | |
| 2005/0276493 A1 | 12/2005 | Xin et al. | |
| 2005/0281337 A1 | 12/2005 | Kobayashi et al. | |
| 2005/0286630 A1 | 12/2005 | Tong et al. | |
| 2006/0002466 A1 | 1/2006 | Park | |
| 2006/0017802 A1 | 1/2006 | Yoo et al. | |
| 2006/0056513 A1 | 3/2006 | Shen et al. | |
| 2006/0056708 A1 | 3/2006 | Shen et al. | |
| 2006/0109910 A1 | 5/2006 | Nagarajan | |
| 2006/0115001 A1 | 6/2006 | Wang et al. | |
| 2006/0133501 A1 | 6/2006 | Lee et al. | |
| 2006/0133506 A1 | 6/2006 | Dang | |
| 2006/0176299 A1 | 8/2006 | Subbalakshmi et al. | |
| 2006/0176962 A1 | 8/2006 | Arimura et al. | |
| 2006/0203916 A1 | 9/2006 | Chandramouly et al. | |
| 2006/0291563 A1 | 12/2006 | Park et al. | |
| 2007/0002945 A1 | 1/2007 | Kim | |
| 2007/0002950 A1 * | 1/2007 | Yang | 375/240.16 |
| 2007/0036215 A1 | 2/2007 | Pan et al. | |
| 2007/0070080 A1 | 3/2007 | Graham et al. | |
| 2007/0133689 A1 | 6/2007 | Park et al. | |
| 2007/0171981 A1 | 7/2007 | Qi | |
| 2007/0217506 A1 | 9/2007 | Yang et al. | |
| 2007/0230564 A1 | 10/2007 | Chen et al. | |
| 2007/0274389 A1 | 11/2007 | Kim et al. | |
| 2007/0286284 A1 | 12/2007 | Ito et al. | |
| 2007/0286508 A1 | 12/2007 | Le Leannec et al. | |
| 2008/0069203 A1 * | 3/2008 | Karczewicz et al. | 375/240.01 |
| 2008/0117214 A1 | 5/2008 | Perani et al. | |
| 2008/0137726 A1 | 6/2008 | Chatterjee et al. | |
| 2008/0151997 A1 | 6/2008 | Oguz | |
| 2008/0285444 A1 | 11/2008 | Diab et al. | |
| 2009/0060277 A1 | 3/2009 | Zhang et al. | |
| 2009/0086827 A1 | 4/2009 | Wu et al. | |
| 2009/0116549 A1 | 5/2009 | Shen et al. | |
| 2009/0122864 A1 | 5/2009 | Palfner et al. | |
| 2009/0161763 A1 | 6/2009 | Rossignol et al. | |
| 2009/0196350 A1 | 8/2009 | Xiong | |

(56) References Cited

U.S. PATENT DOCUMENTS

| | | |
|---|---|---|
| 2009/0268974 A1 | 10/2009 | Takagi |
| 2010/0034268 A1 | 2/2010 | Kusakabe et al. |

FOREIGN PATENT DOCUMENTS

| | | |
|---|---|---|
| GB | 2348559 | 3/1999 |
| JP | 04162893 | 6/1992 |
| JP | 11096138 | 4/1999 |
| JP | 2001184323 | 7/2001 |
| JP | 2005-192232 A | 7/2005 |
| JP | 2005354686 | 12/2005 |
| JP | 2006287315 | 10/2006 |
| WO | 9827742 | 6/1998 |
| WO | 0233650 | 4/2002 |
| WO | 2005001625 | 6/2003 |
| WO | 2005096168 | 10/2005 |
| WO | 2006085137 | 8/2006 |

OTHER PUBLICATIONS

3D Graphics Processor for Mobile Set Based on Configurable Processor; Takemoto, Takashi et al.

Jamil-Ur-Rehman and Dr. Zhang Ye, "Efficient Techniques for Signaling Intra Prediction modes of H.264/ Mpeg-4 Part 10", Proceedings of the First International Conference on Innovative Computing, Information and Control, ICICIC, Year 2006, pp. 1-4.

Jong, et al., "Accuracy Improvement and Cost Reduction of 3-Step Search Block Matching Algorithm for Video Coding", Feb. 1, 1994, IEEE Transaction on Circuits and Systems for Video Technology, vol. 4 No. 1, pp. 88-90, XP000439487.

Mizuno, M. et al.; "A 1.5-W single-chip MPEG-2 MP@ML video encoder with low power motion estimation and clocking," Solid-State Circuits, IEEE Journal of, vol. 32, No. 11, pp. 18-7-1816, Nov. 1997.

Realization of Low-Bit_Ratio Video Encoder Using Mpact Media Processor; Iwasaki, Junichi et al.; 1997.

Rohini Krishnan, et al., "Design of a 2D DCT/IDCT Application Specific VLIW Processor Supporting Scaled and Sub-sampled Blocks," 16th International Conference on VLSI Design, 2003, six pages.

Shih-Hao Wang et al.; "A platform-based MPEG-4 advanced video coding (AVC) decoder with block level pipelining," Information, Communications and Signal Processing, 2003 and the Fourth Pacific Rim Conference on Multimedia Proceedings of the 2003 Joint Conference of the Fourth International Conference on, vol. 1, No., p. 51-55 vol. 1, Dec. 2003.

Tourapis et al., Proc. of SPIE Conf. Vis. Comm. and Img. Processing, vol. 3, pp. 1365-1373, Jun. 2000.

Tu, C., Liang, J., and Tran, T. "Adaptive Runlength Coding", in_IEEE Signal Processing Letters_vol. 10, No. 3, pp. 61-66. Mar. 2003.

Tung-Chien Chen; Yu-Wen Huang; Liang-Gee Chen, "Analysis and design of macroblock pipelining for H.264/AVC VLSI architecture," Circuits and Systems, 2004. ISCAS '04. Proceedings of the 2004 International Symposium on, vol. 2, No., pp. 11-273-6 vol. 2, May 23-26, 2004.

Zheng, et al., Inter. Conf. Info. Systems, Analysis and Synthesis, SCI 2001-ISAS 2001, vol. 13, 2001.

"Ralf Schafer et al.,", "H264/AVC", Dated: Jan. 2003, pp. 1-12.

_The Merriam-Webster Dictionary_. 2005 ed. Springfield, MA: Merriam-Webster Inc., 2005.

3D Graphics Processor for Mobile Set Based on Configurable Processor; Takemoto, Takashi et al. Year 2004.

A Single-Chip Video/Audio Codec for Low Bit Rate Application Seongmo Park, Seongmin Kim, Igkyun Kim, Kyungjin Byun, Jin Jong Cha, and Hanjin Cho, ETRI Journal, vol. 22, No. 1, Mar. 2000, pp. 20-29.

Advanced Video Coding for generic audiovisual services, Telecommunication Standardization Sector of ItU, Dated Mar. 2005, pp. 1-343.

Andrew Gibson, "H.264 Video Encoding Standard", year Aug. 2002, pp. 1-98, Queens University Kingston Ontario Canada.

Chen, Hao et al., "Adaptive FMO Selection Strategy for Error Resilient H.264 Coding" International Conference on Audio, Language and Image Processing, 2008. ICALIP 2008, Jul. 7-9, 2008, pp. 868-872.

Hannuksela, Miska et al., "Random Access Using Isolated Regions", IEEE 2003, pp. III-841 to III to 844.

Iwasaki, I.; Naganuma, J.; Nitta, K.; Yoshitome, T.; Ogura, M.; Nakajima, Y.; Tashiro, Y.; Onishi, T.; Ikeda, M.; Endo, M., "Single-chip MPEG-2 422P@HL CODEC LSI with multi-chip configuration for large scale processing beyond HDTV level," Design, Automation and Test in Europe Conference and Exhibition, Mar. 2003.

Kadono Shinya, et. al Revised edition H 264/AVC Textbook, Impress R&D, Jan. 1, 2006, pp. 131-133.

\* cited by examiner

| Cycle | Operation 1 | Operation 2 | Operation 3 | Operation 4 |
|---|---|---|---|---|
| 0 | A – X (= AX) | | | |
| 1 | B – X (= BX) | (AX + BX + 1) >> 1 | | |
| 2 | C – X (= CX) | (BX + CX + 1) >> 1 | | |
| 3 | D – X (= DX) | (AX + DX + 1) >> 1 | | |
| 4 | E – X (= EX) | (DX + EX + 1) >> 1 | (BX + EX + 1) >> 1 | (AX + BX + DX + EX + 2) >> 2 |
| 5 | F – X (= FX) | (EX + FX+1) >> 1 | (CX + FX+1) >> 1 | (BX + CX + EX + FX + 2) >> 2 |
| 6 | G – X (= GX) | (DX + GX+1) >> 1 | | |
| 7 | H – X (= HX) | (GX + HX + 1) >> 1 | (EX + HX + 1) >> 1 | (DX + EX + GX + HX + 2) >> 2 |
| 8 | I – X (= IX) | (HX + IX + 1) >> 1 | (FX + IX + 1) >> 1 | (EX + FX + HX + IX + 2) >> 2 |

METHODS AND SYSTEMS FOR MOTION ESTIMATION USED IN VIDEO CODING

BACKGROUND

1. Field of the Application

Generally, this application relates to the coding of video signals. More specifically, it relates to systems and methods for efficient, variable block size motion estimation used in video coding.

2. Description of the Related Art

The typical video display, such as a cathode ray tube (CRT) display or a liquid crystal display (LCD), provides a visible picture that is made up of a sequence of individual images, or frames, indexed by time. The sequence of frames is displayed, for example, at a rate of 30 frames per second. Because each frame includes a large amount of raw information, the sequenced video data is associated with a very high bandwidth requirement. This high bandwidth requirement typically necessitates efficient video compression coding to facilitate more efficient handling of the sequenced video data.

Figure 1:
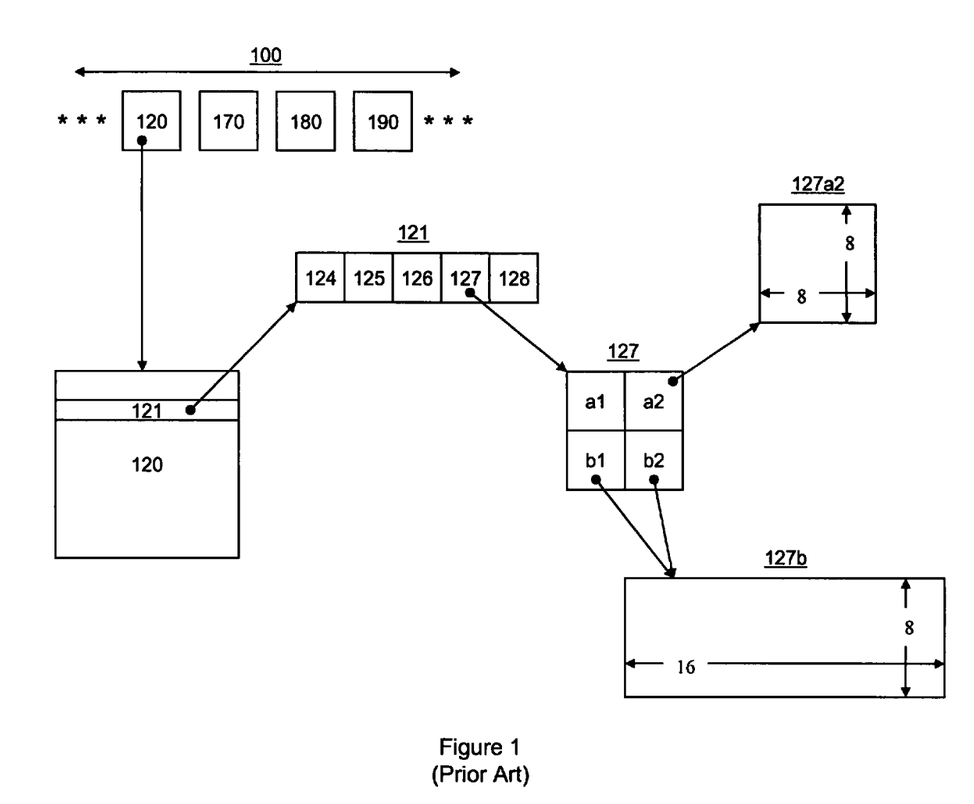
FIG. 1 illustrates the typical video sequence breakdown as is known in the art today.

FIG. 1 illustrates the typical video sequence breakdown as is known in the art today. As shown in FIG. 1, a typical video sequence 100 includes a time indexed stream of individual frames 120, 170-190. A particular frame 120 is made up of many slices of data, for example, slice 121. Slice 121 can typically be partitioned into a set of macro-blocks 124-128, where each macro-block is typically 16 picture elements (or pixels) by 16 pixels. Thus, frame 120 can be thought of as a grid of macro-blocks. Representative macro-block 127 can be further sub-divided, for example, into two 16×8 sub-blocks, such as 127b, or into four 8×8 sub-blocks, such as 127a2. Frames can be broken down into many different sizes, shapes and configurations of macro-blocks and sub-blocks.

Figure 2:
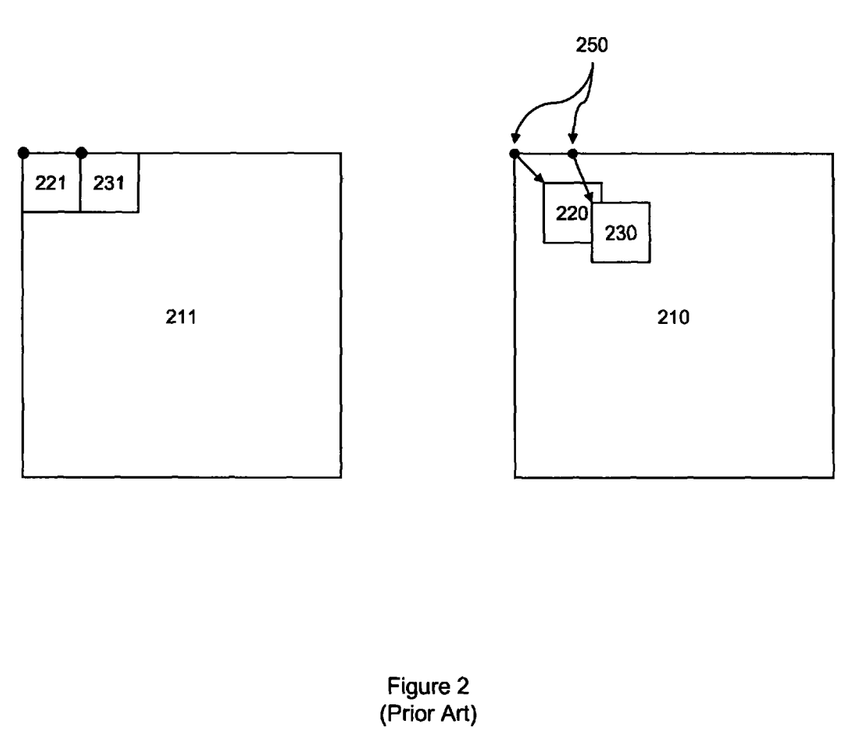
FIG. 2 illustrates a very simple block-motion model as is conventionally used in the art today.

The typical video sequence is characterized by a high degree of correlation between successive frames. Given the highly correlated nature of consecutive frames, a very simple block-motion model can offer a reasonably good description of the video process. FIG. 2 illustrates a very simple block-motion model as is typically used in the art today. In this simple block-motion model, a current frame 211 includes two current macro-blocks 221, 231. Each current macro-block 221, 231 can be thought of as being shifted from a previous macro-block 220, 230 of a previous frame 210. The shift of each current macro-block 221, 231 can be indicated by a motion vector 250 associated with their respective previous macro-block 220, 230. Thus, each macro-block in a current frame can be viewed as arising from a shifted location of that same macro-block in the previous frame, where the amount of shift is designated by its motion vector.

Commercial grade video compression systems known in the art today, including well-known industry standards, such as, International Telecommunications Union (ITU) H.261, H.263 and H.264, as well as International Standardization Organization (ISO)/International Electro-technical Commission (IEC) MPEG-1, MPEG-2 and MPEG-4, utilize the above properties associated with the video process to efficiently represent and compress video data. In recent years, advances have been made in how motion vector data is represented in the video bit-stream syntax, starting from H.261, when a single motion vector at full pixel resolution was allowed per macro-block, to H.264, where multiple motion vectors (as high as one per 4×4 sub-block or 16 per macro-block) at quarter-pixel resolutions and pointing to multiple reference frames are used.

In general, these video coding systems deploy a motion estimation module that searches for, and measures, the most likely motion vector for the current block (e.g., macro-block, sub-block, full frame, etc.) of data being analyzed. Typically, the motion estimation module is the most computation-intensive, and thus power-hungry, module of a particular video coding system. Once the motion vector is estimated by the motion estimation module, the motion vector, along with any residue information, between the current block of data and the predictor or reference block (i.e., the preceding block from the preceding frame), pointed to by the motion vector, is encoded to form the compressed bit-stream. Typically, the lower the amount of residue information the better the motion estimation.

Accordingly, sophisticated motion estimation algorithms attempt to offer a video quality similar to that of performing an exhaustive pixel-by-pixel motion search, but with a much lower complexity than the exhaustive search. One conventionally popular, high-performance motion estimation algorithm is called the unrestricted center biased diamond search (UCBDS) algorithm. The UCBDS algorithm generally compares a 16×16 macro-block in the current frame to a selection of 16×16 macro-blocks in the reference (or preceding) frame until the 'best' motion vector is determined. The most common metric used to compare various motion vector positions is the sum of absolute differences (SAD) metric. However other metrics are known in the art and at least some of them can also benefit from certain embodiments disclosed herein. As the name suggests, SAD is obtained by adding the absolute value of the differences between the current and reference pixel values over all of the pixels of the blocks under analysis. That is, for a 16×16 block SAD comparison between a current frame block and a reference frame block, each of the values of the 256 pixels in the current block is subtracted from each of the values of the associated 256 pixels in the reference block. The absolute values of all of these 256 pixel value differences are then added together to result in the SAD value for that block comparison. As one might expect, the lower the SAD value the better the motion vector position.

Typically, the UCBDS algorithm selects a starting position in the current block, e.g., the upper, left-hand integer pixel, and then selects a corresponding seed position in the reference block with which to begin the SAD comparisons. The seed position in the reference block will be the starting location (i.e., the upper, left-hand pixel) for defining the reference block in the reference frame. The UCBDS will compare the SAD value at the seed position to the SAD values at positions in a diamond pattern that is centered around the seed position, where the points of the diamond pattern are at locations that are plus or minus two (+/−2) pixels away from the seed position (i.e., for a total of nine SAD calculations). If the SAD value at the seed position is the best, then the UCBDS algorithm is complete for that block and the motion vector for determined. However, if one of the pixel locations on the diamond pattern results in the best SAD value, then that location is set as a new seed position and its SAD value is now compared to the SAD values at locations defined by a new diamond pattern centered around that new seed position. This method is continued until the new seed position has the best SAD value as compared to the SAD values at locations on the diamond pattern around it. On average, the UCBDS algorithm is known to finish searching and comparing after calculating the SAD values at about 18-20 integer pixel locations, resulting in a good motion vector for a particular block.

Where the motion vectors are desired to be represented with half-pixel accuracy, a conventional strategy for determining a half-pixel motion vector consists of first determining a good integer pixel resolution motion vector (as above, with the UCBDS algorithm) and then searching and comparing the SAD values at the eight half-pixel locations around the good integer pixel motion vector location to find a good half-pixel motion vector location. Likewise, when motion vectors are desired to be represented with quarter-pixel accuracy, first the good integer pixel motion vector location is determined, which is followed by determining the good half-pixel motion vector location, which in turn is followed by searching and comparing the SAD values at the eight quarter-pixel locations around the good half-pixel motion vector location to find a good quarter-pixel motion vector location.

As used herein, integer pixel and pixel (i.e., without qualification) refer to the actual, picture element location within a particular block (i.e., macro-block, sub-block, etc.) or frame, while sub-pixel (i.e., partial-pixel, half-pixel, quarter-pixel, and the like) refers to a fictitious picture element located a fraction of the way (i.e., one, two or three quarters of the way, and the like) between two integer pixel locations (i.e., horizontally, vertically and/or diagonally). A sub-pixel location is typically associated with a value given by a weighted averaging of the values of the nearby integer locations. For example, in the MPEG-4 video compression standard, the vertical half-pixel location between two vertically adjacent integer pixels with values A and B, respectively, is given by equation (1):

$$\text{round}((A+B)/2), \quad (1)$$

where "round" denotes a rounding operation. Of course, equation (1) is for illustrative purposes only and is in no way intended to limit the scope of this application.

A naïve algorithm to determine quarter-pixel accuracy would exhaustively search all eight half-pixel locations followed by exhaustively searching all eight quarter-pixel locations before providing a good quarter-pixel motion vector location. This can result in as many as sixteen extra searches and SAD comparisons, on top of the original 18-20 integer pixel searches. Additionally, more computations are required to determine the values corresponding to all of the half- and quarter-pixel locations. Furthermore, when variable block size motion vectors and multiple reference frames are allowed, such a search must potentially be carried out for each variety of block size and reference frame used. In summary, the possibility of sub-pixel, variable block sized, motion vectors can significantly increase the complexity of the motion estimation module.

Therefore, what are needed are systems and methods for performing the computations associated with motion estimation for variable block size, sub-pixel motion vectors in a more efficient manner, for example, by using a common core of SAD computations that are capable of quickly calculating different block size motion vector resolutions, at least partially in parallel.

BRIEF DESCRIPTION OF THE DRAWINGS

Aspects and features will become apparent to those ordinarily skilled in the art from the following detailed description of certain embodiments in conjunction with the accompanying drawings, wherein.

DETAILED DESCRIPTION

Certain embodiments will now be described in detail with reference to the drawings, which are provided as illustrative examples so as to enable those skilled in the art to practice the embodiments and are not meant to limit the scope of the present application. Where certain elements of embodiments can be partially or fully implemented using known components or steps, only those portions of such known components or steps that are necessary for an understanding of the embodiments will be described, and detailed description of other portions of such known components or steps will be omitted so as to not obscure the embodiments. Further, certain embodiments are intended to encompass presently known and future equivalents to the components referred to herein by way of illustration.

Certain embodiments will be illustrated with an MPEG-4 simple profile example wherein half-pixel motion resolution and two different block sizes (e.g., 16×16 and 8×8) are used in conjunction with the UCBDS motion search algorithm discussed above. However, those skilled in the art will recognize that certain embodiments are broadly applicable to any block size as well as any sub-pixel resolution. Further, various video compression standards and motion search algorithms can also benefit from certain embodiments. All combinations of block sizes, sub-pixel resolutions, compression standards and search algorithms are intended to be within the scope of the present application.

Figure 3:
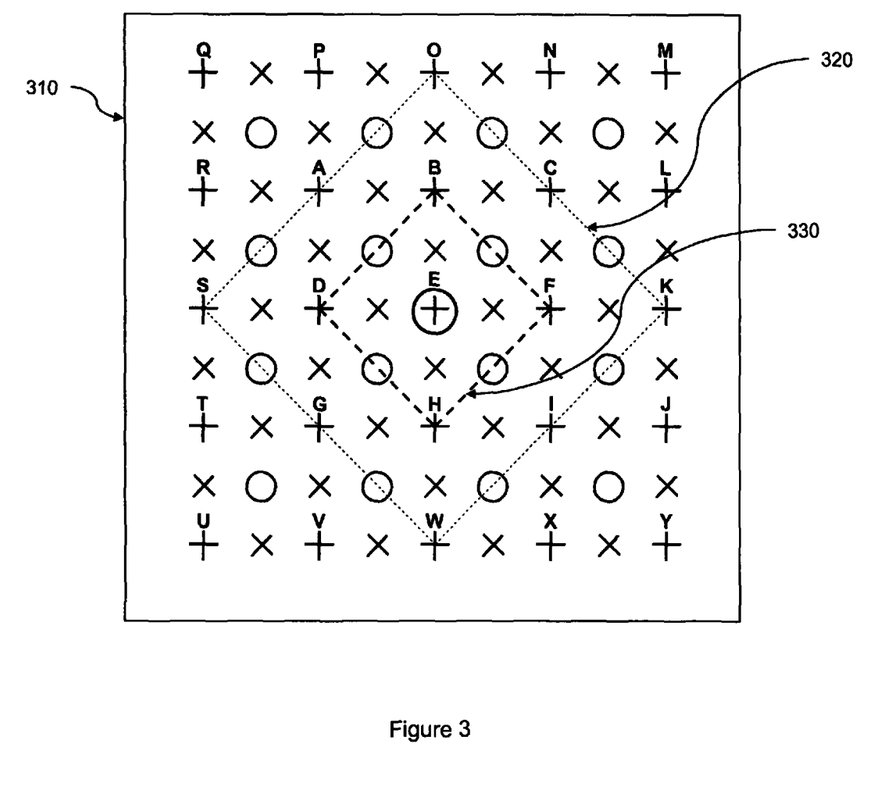
FIG. 3 illustrates a portion of an exemplary reference frame, showing full pixel positions and half-pixel locations as used in conjunction with certain embodiments.

Consider FIG. 3, which illustrates a portion of an exemplary reference frame 310 (i.e., the previous frame to which a current frame is compared), showing full pixel positions with plus signs, +s, and half-pixel locations with the letters X and O (e.g., Xs and Os), as used in conjunction with certain embodiments. Assume in FIG. 3 that full pixel E represents a UCBDS location for a good motion vector for the current 16×16 macro-block and corresponds to the center pixel of a UCBDS diamond 320 defined by pixels S, A, O, C, K, J, W and G. At this point, the typical diamond evolution of the UCBDS search algorithm, as discussed above, has been completed.

Figure 4:
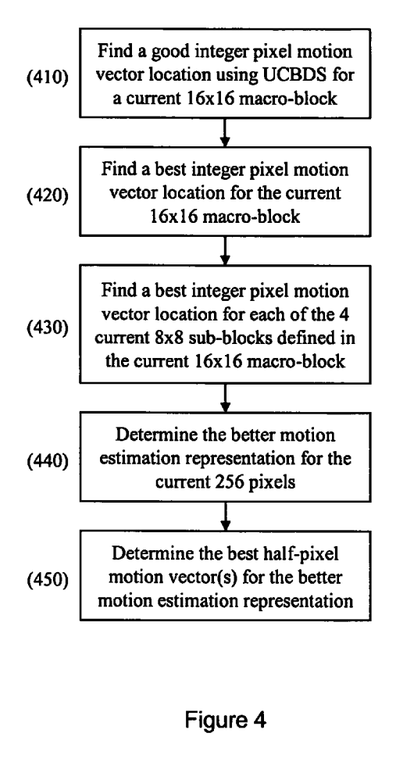
FIG. 4 illustrates an additional algorithmic method that can enhance the motion estimation of the typical UCBDS algorithm and be used according to certain embodiments.

FIG. 4 illustrates an additional algorithmic method that can enhance the motion estimation of the typical UCBDS algorithm and be used according to certain embodiments. As shown in FIG. 4, this additional algorithm begins at step 410 where the typical UCBDS algorithm ends, i.e., with a good integer pixel motion vector location for a current 16×16 macro-block. At steps 420a-b, pixel data for the current and reference blocks are retrieved and the SAD for four more integer pixel locations can be compared to the SAD at the UCBDS good motion vector location (e.g., each SAD being calculated using the current 16×16 macro-block). As shown in FIG. 3, these four additional integer pixel locations of reference frame 310 correspond to a set of full pixel locations in an internal diamond 330 defined by pixels D, B, F and H, and adjacent to the good motion vector location, E. The better SAD of these five full pixel locations is then chosen as the best integer pixel motion vector location for the current 16×16 macro-block. For this example, and without limitation, let the corresponding motion vector for the current 16×16 macro-block associated with the best integer pixel motion vector location be denoted as mv_16×16 and the associated SAD for this location be denoted as SAD_16×16.

At steps 430a-b, pixel data for the current sub-blocks and reference sub-blocks are retrieved so that searches and SAD comparisons can be performed to determine the best integer pixel motion vector location for each of the four current 8×8 sub-blocks defined in the current 16×16 macro-block. The current 16×16 macro-block can be divided into four 8×8 sub-blocks. Each of these four current 8×8 sub-blocks has, initially, a corresponding reference 8×8 sub-block within the reference 16×16 macro-block that is defined by the mv_16×16 location. For each of the four current 8×8 sub-blocks, a best full pixel motion vector can be determined by comparing the SAD at the initial location for a particular 8×8 reference sub-block to the SADs at the locations corresponding to the eight adjacent integer pixels to the initial location (i.e., for a total of nine SAD calculations at integer pixel locations arranged in a square, with the initial location at the center of the square). The best integer pixel motion vector location for each of the 8×8 sub-blocks is chosen from these nine locations. For this example, and without limitation, let the corresponding motion vectors for each of the current 8×8 sub-blocks be denoted as mv_8×8(i) and the associated SAD at each of the four locations be denoted as SAD_8×8(i), for i=0, 1, 2, 3.

At step 440, the integer pixel motion vector for the 16×16 macro-block, mv_16×16, is compared to the four integer pixel motion vectors for the four 8×8 sub-blocks, mv_8×8(i), to determine which representation is better for estimating the motion of the current 256 pixels (i.e., the pixels within the current 16×16 macro-block and within the four current 8×8 sub-blocks). Specifically, the condition of equation (2), below, is evaluated.

$$SAD\_16 \times 16 - \text{offset } SAD\_8 \times 8(0) + SAD\_8 \times 8(1) + SAD\_8 \times 8(2) + SAD\_8 \times 8(3), \quad (2)$$

where 'offset' is a positive quantity to compensate for an estimated amount of additional overhead required to encode four 8×8 motion vectors as compared to only one 16×16 motion vector for the same current 256 pixels. If the condition of equation (2) is true, then the four 8×8 integer pixel motion vectors, mv_8×8(i), are considered better. If the condition of equation (2) is false, then the one 16×16 motion vector, mv_16×16, is considered better for estimating the motion of the current 16×16 macro-block. As will now be evident to those skilled, 'offset' can be selected such that the comparison made in equation (2) could favor either half of the expression.

In steps 450a-b, pixel data for the current and reference (sub-)blocks are retrieved and, for the chosen condition of equation (2) from step 440 (i.e., either the four 8×8 motion vectors or the one 16×16 motion vector), the best half-pixel motion vector(s) is (are) determined. Assuming for this example that pixel E of FIG. 3 is still the best location and that the one 16×16 motion vector is the better motion estimation representation, then the best motion vector location between E and the four Xs and four Os immediately adjacent to E (i.e., the 8 half-pixels either on or within inner diamond 330) will be selected. This selection can be accomplished by comparing the SAD for each of the eight half-pixel locations to the SAD at full pixel center of the half-pixel locations. The better of these nine locations would then be selected as the motion vector location and the process for that current macro-block would end, while the same process for a new current 16×16 macro-block would begin. However, in some implementations, determining the best half-pixel location can be abbreviated based on statistically analyses, to only those half-pixel locations that have the greatest likelihood of producing a lower SAD value than the SAD of the associated full pixel location. For example, the half-pixel determination step can be limited to searching and comparing only the three half-pixel locations to the right, below and diagonally right-below the previously chosen better integer pixel location.

A step-by-step, serial implementation of the additional algorithm illustrated in FIG. 4 can result in fetching the same reference data from the reference frame and the same current data from the current frame into a processor's computation unit over and over again. It can also result in repeating the same or similar calculations over and over again. For example, the individual pixel value differences between the macro-block defined by the reference pixel location E and the corresponding pixel location in the current macro-block, i.e., $X_E$, used to calculate the 16×16 integer pixel SAD can also be used in the computation of the corresponding 8×8 integer pixel SAD, as well as the half-pixel SAD calculations for the half-pixel locations in the neighborhood of E. Certain embodiments can store at least some of these repetitive and often-used calculation results to improve computational performance of the motion estimation process and modules by performing at least some (or some portions of) the various SAD calculations in parallel.

For example, in the case of a motion estimation module operating within a 32-bit architecture environment and using an 8-bit pixel resolution, the cycle count for the serial implementation of FIG. 4 can be computed as follows. Note that cycles are being counted from the point where the UCBDS stops (i.e., after step 410). First, at steps 420a-b, a 16×16 macro-block will include 64 words of 4 bytes each. If it takes one cycle to load a word, then one row of data from the macro-block will load in 4 cycles. For the case when memory is not aligned properly, an extra cycle will be needed. This results in a total of 5 cycles per row, which results in 80 cycles for one 16×16 integer pixel SAD. Since this SAD is calculated at 4 pixel locations of internal diamond 330, a total of at least 320 cycles will be needed to complete steps 420a-b.

Second, at steps 430a-b, for each of the 8×8 sub-blocks, assuming an unaligned memory access, 3 cycles will be needed to load a row. This results in a total of 24 cycles per 8×8 sub-block, which results in 96 cycles for all four of the 8×8 sub-blocks. If searching nine locations for each of the 8×8 sub-blocks, this corresponds to almost 900 cycles. The overhead for evaluating the step 440 condition is nominal by comparison and will be ignored for this example.

Finally, at steps 450a-b, half-pixel computations are made. Before going into the half-pixel details, note that for both vertical and diagonal half-pixel computations, two rows must be fetched for generating one row of half-pixels. For horizontal-only half-pixel computations, however, only one row of integer pixels must be fetched to generate the half-pixel values. In the implementations of certain embodiments presented herein, the examples assume only computing half-pixel values for at three half-pixel locations: one horizontal half-pixel to the right, one vertical half-pixel down and one diagonal half-pixel down and to the right for either a 16×16 block or the four 8×8 blocks, depending on whether the 16×16 representation is better or the four 8×8 representations are better.

First, when the one 16×16 representation is better, vertical and diagonal half-pixel computations consume about 160 cycles per SAD. The horizontal half-pixel computation would consume about 80 cycles. Thus, the three half-pixel computations would consume about 400 cycles. Second, when the four 8×8 representations are better, the vertical and diagonal half-pixel computations would consume about 48 cycles and the horizontal half-pixel computation would consume around 24 cycles, for each 8×8 sub-block. Thus, the three half-pixel computations would consume about 120 cycles per 8×8 sub-block. Given that there are four such 8×8 sub-blocks in a 16×16 macro-block, half-pixel computations for all four 8×8 sub-blocks would consume about 500 cycles.

To summarize the example of a serial implementation of the process shown in FIG. 4: when the 16×16 representation is better, it would take a total of about 1600 cycles to perform the algorithm; and when the four 8×8 representations are better, it would take a total of about 1720 cycles to perform the algorithm. Therefore, certain embodiments can take advantage of the strong commonality in the data needed for, and computations of, the various SAD calculations to reduce the processing cycles needed to perform the exemplary algorithm of FIG. 4. As in the above exemplary cycle calculations, the description below of certain embodiments assumes a 32-bit architecture and a per-pixel resolution of 8 bits.

Referring back to FIG. 3, certain embodiments consist of maintaining (e.g., storing accumulating or collecting, for example in random access memory, registers, accumulators, disks, memory cards, etc., and the like) the integer pixel value differences used for nine SAD calculations for each of the four 8×8 sub-blocks at each of the nine full pixel locations including and adjacent to the best location (i.e., A, B, C, D, E, F, G, H and I in FIG. 3, where E is the best location) resulting in maintaining a total of 36 SAD calculations for all four 8×8 sub-blocks. Further, certain embodiments can include maintaining the half-pixel values and half-pixel value differences used for 16 half-pixel SAD calculations for each of the four 8×8 sub-blocks corresponding to each of the 16 half-pixel locations between the nine full pixel locations including and adjacent to the best location (i.e., the half-pixel Xs and Os between each pair of the integer pixel locations of A, B, C, D, E, F, G, H and I in FIG. 3) resulting in a total of 64 SAD calculations for all four 8×8 sub-blocks. The corresponding 16×16 SAD calculations, both integer pixel and half-pixel, can be directly inferred from all of the maintained 8×8 SAD calculations.

Figure 5:
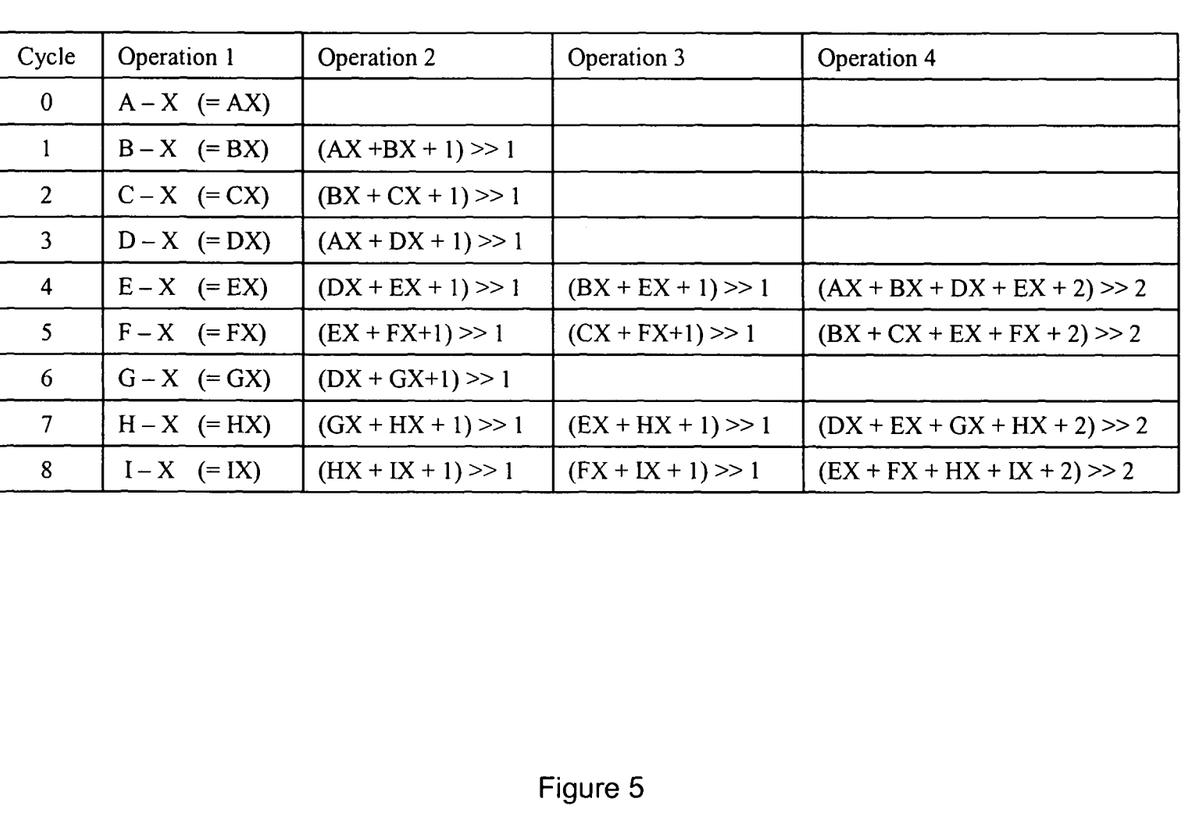
FIG. 5 illustrates an exemplary schematic for pipelining at least some of the operations for simultaneous SAD calculations according to certain embodiments.

FIG. 5 illustrates an exemplary flow for pipelining, or parallelizing, at least some of the operations for simultaneous SAD calculations according to certain embodiments, so as to better utilize the system resources while decreasing the cycle count required for accomplishing the SAD calculations. In FIG. 5, each operand shown corresponds to a set of 4 adjacent integer pixels in a row identified, for discussion purposes only, by the left-most pixel in the row. This example uses a naming convention such that the letters A through I denote data locations from the reference frame (as illustrated in FIG. 3) that are used in SAD calculations for current data (i.e., macro-block, sub-block, etc.) in the current frame, which is denoted by the letter X. In this example, assume that SAD calculations are desired as between each of the reference frame locations (i.e., A through I) and the current data location for a 16×16 macro-block.

As shown in FIG. 5, certain embodiments can achieve a complete set of calculations for one 4-byte word in 9 cycles (i.e., as used in this example, a "complete set" refers to the calculations discussed above with reference to steps 420-450 of FIG. 4). Since each macro-block has a size equal to 64 words (i.e., 256 pixels at 8 bits per pixel using 4-byte words), this results in a total of only about 576 cycles the entire macro-block (i.e., 9 cycles per word for 64 words). This represents about a 64-66% decrease in the number of required cycles over the serial approach shown in FIG. 4, which was shown to take between about 1600 and 1700 cycles to accomplish the same task.

Figure 6:
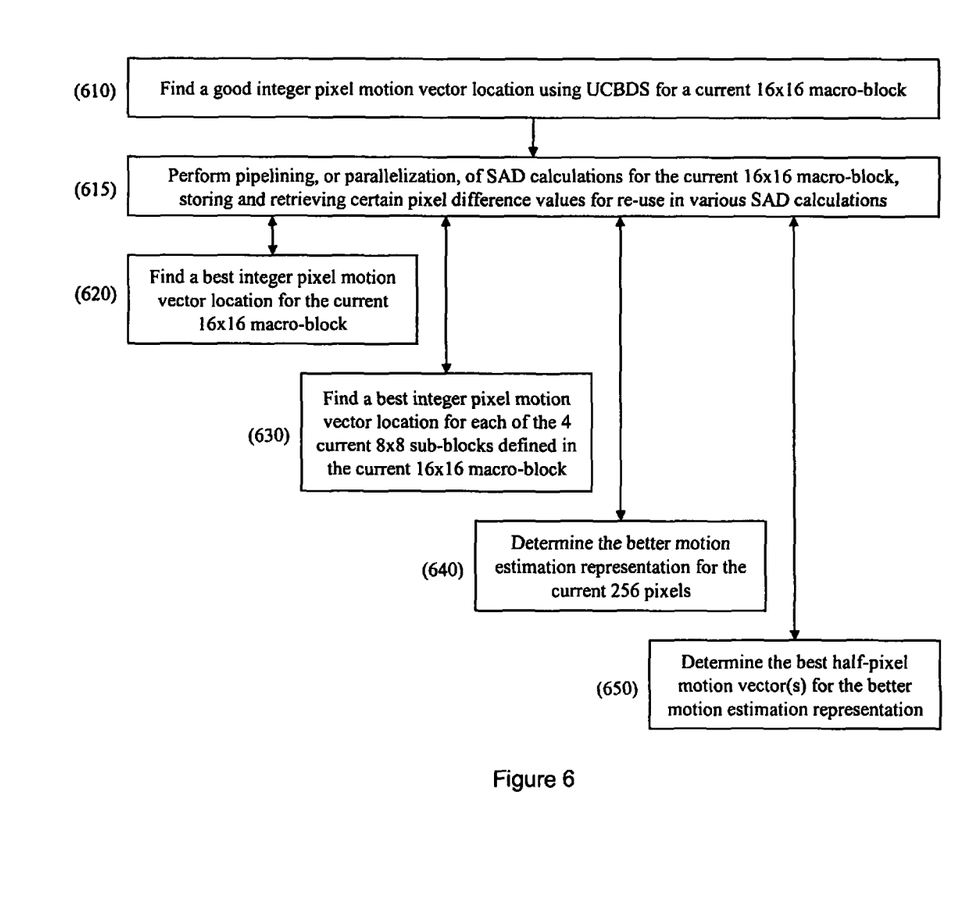
FIG. 6 illustrates an exemplary parallelization of SAD calculations for a 16×16 macro-block according to certain embodiments.

FIG. 6 illustrates an exemplary parallelization of SAD calculations for a 16×16 macro-block according to certain embodiments. As shown in FIG. 6, and similar to FIG. 4 for ease of comparison purposes, step 610 begins where the where the typical UCBDS algorithm ends, i.e., with a good integer pixel motion vector location for a current 16×16 macro-block. At steps 615a-b pixel data for the current and reference blocks are retrieved and pipelining calculations for the current block are performed and maintained. These pipelined calculations help to parallelize the process of FIG. 6 as compared to the serial process of FIG. 4. In this example, as discussed further with reference to FIG. 5, steps 620-650 can be accomplished for a complete set of calculations for one 4-byte word in 9 cycles. Steps 620-650 generally accomplish the same result as steps 420-450 of FIG. 4. However steps 620-650 are pipelined, or parallelized, and do not necessarily require repetitive fetches of the current and reference data, as do steps 420a, 430a and 450a. Additionally, in certain embodiments, step 615a of FIG. 6 can be performed prior to step 610, to accomplish retrieving the current and reference data only once for the UCBDS portion of this exemplary method as well as for steps 620-650.

Figure 7:
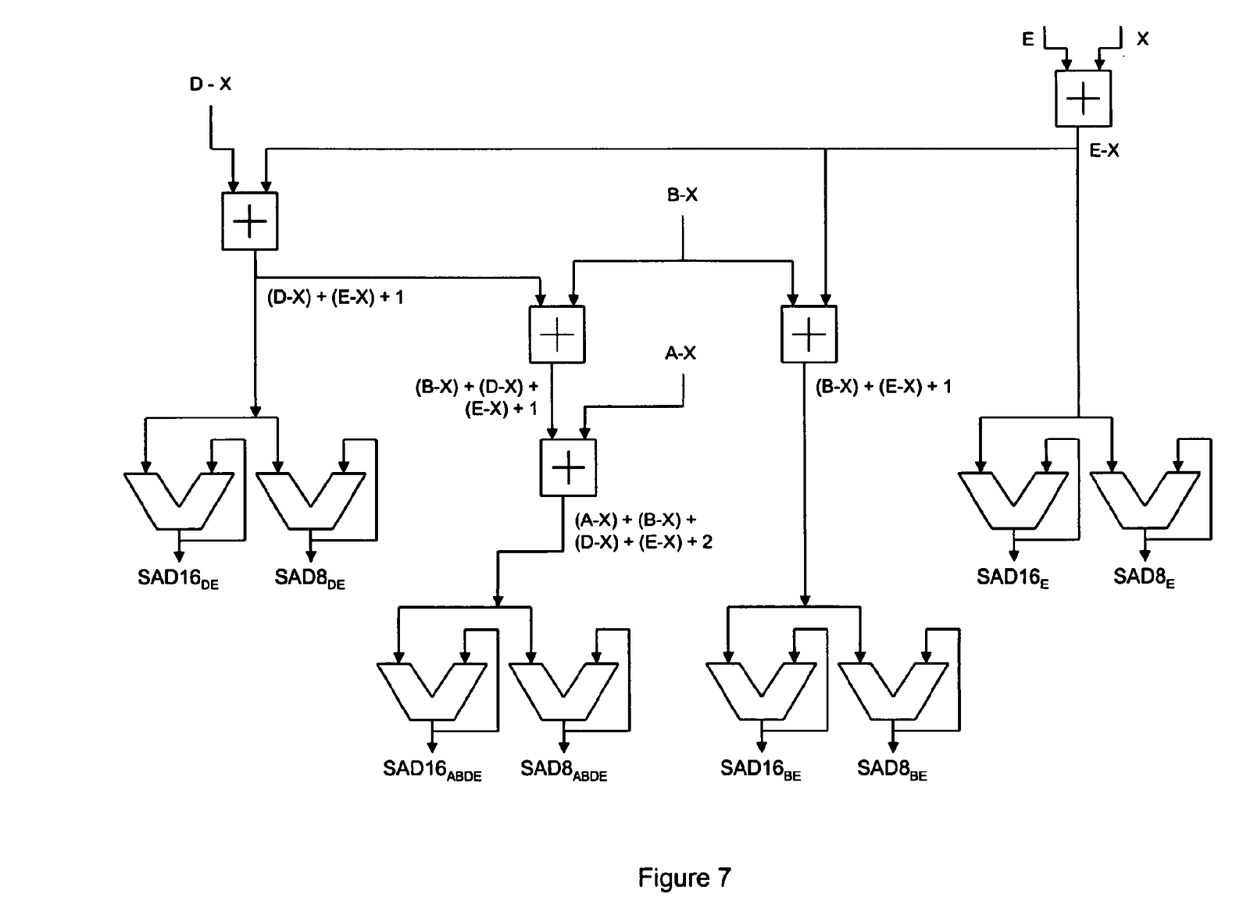
FIG. 7 illustrates an instance of a hardware design that facilitates the processing of cycle four as shown in FIG. 5 according to certain embodiments.

Further examining FIG. 5, cycles 4, 5, 7, and 8 correspond to the most intensive processing cycles in this exemplary pipelined processing chain. The underlying hardware for each of these cycles would need sufficient logic so as to enable performance of the operations in a single cycle. One example of an efficient hardware design that facilitates the above mentioned processing is shown in FIG. 7. Without loss of generality, the action of this hardware design is further illustrated for cycle 4 of the pipelined processing chain of FIG. 5. Further, upon review of this hardware design with reference to FIG. 5 and the remainder of this disclosure, it will become apparent to those skilled in the art how to expand and implement the certain embodiments of this disclosure into various video coding applications using various combinations of software and hardware, including, for example, application specific integrated circuits (ASICs), processors, micro-controllers and the like.

For example, consider the case when the pixel location E (as shown in FIG. 3) is being processed for SAD computation in the UCBDS algorithm (e.g., step 410 of FIG. 4) for a current macro-block. Assume further that pixels A, B, C and D were processed as in cycles 0, 1, 2, 3 of FIG. 5 to generate their corresponding SAD computations before the SAD computation for pixel E is performed. FIG. 7 shows the computations that can be performed simultaneously to obtain other SAD values along with the regular 16×16 SAD computation performed for pixel E. Based on these assumption, difference results corresponding to pixels adjacent to E, i.e., (D-X), (B-X) and (A-X), have already been calculated and stored. With these previously calculated values available, all of the following SAD computations can be performed simultaneously with the hardware shown in FIG. 7 (i.e., where the → symbol indicates an accumulation operation).

16×16 Integer Pixel SAD corresponding to Pixel E ($SAD16_E$)

$$SAD16_E \rightarrow SAD16_E + |E-X|$$

8×8 Integer Pixel SAD corresponding to Pixel E ($SAD8_E$)

$$SAD8_E \rightarrow SAD8_E + |E-X|$$

16×16 Vertical Half-pixel SAD between B & E ($SAD16_{BE}$)

$$SAD16_{BE} \rightarrow SAD16_{BE} + |((E-X)+(B-X)+1)/2|$$

8×8 Vertical Half-pixel SAD between B & E ($SAD8_{BE}$)

$$SAD8_{BE} \rightarrow SAD8_{BE} + |((E-X)+(B-X)+1)/2|$$

16×16 Horizontal Half-pixel SAD between D & E ($SAD8_{DE}$)

$$SAD16_{DE} \rightarrow SAD16_{DE} + |((E-X)+(D-X)+1)/2|$$

8×8 Horizontal Half-pixel SAD between D & E ($SAD8_{DE}$)

$$SAD8_{DE} \rightarrow SAD8_{DE} + |((E-X)+(D-X)+1)/2|$$

16×16 Diagonal Half-pixel SAD between A, B, D & E ($SAD8_{ABDE}$)

$$SAD16_{ABDE} \rightarrow SAD16_{ABDE} + |((A-X)+(B-X)+(D-X)+(E-X)+2)/4|$$

8×8 Diagonal Half-pixel SAD between A, B, D & E ($SAD8_{ABDE}$)

$$SAD8_{ABDE} \rightarrow SAD8_{ABDE} + |((A-X)+(B-X)+(D-X)+(E-X)+2)/4|$$

Since each of the operands shown in FIGS. 5 and 7 corresponds to a linear set of 4 adjacent pixels, each adder in FIG. 7 consists of 4 atomic adders resulting in a total of nearly 20 adders. Thus, in certain embodiments, the impact of the parallelization of SAD computations according to certain embodiments can be quantified in terms of cycles saved in the overall system picture. For each of the exemplary cases below, assume the following approximate numbers to highlight the overall savings in cycles. Assume a quarter video graphics array (or QVGA) 320×240 resolution video sequence being displayed at 15 frames per second (fps). At this resolution there are 300 macro-blocks per frame, or 4500 macro-blocks per second.

For the serial, motion vector case using a 16×16 half-pixel approach (as illustrated with reference to FIG. 4), it takes about 1600 cycles to fetch the reference and current macro-block data. It will take about another 1280 cycles to perform the initial UCBDS analysis (i.e., assuming 16 SAD computations on average). It will take about 320 cycles to perform the final UCBDS (i.e., assuming 4 integer pixel searches). It will take about 900 cycles to perform the 8×8 integer pixel motion vector calculations. It will take 400 cycles to perform the half-pixel motion vector computations for the 16×16 block. Thus, it will take about 4500 cycles for a macro-block, which means it will take about 20,250,000 cycles (i.e., 4500 cycles per macro-block times 4500 macro-blocks per second) for one second of video (i.e., 20.25 MHz).

For the parallelized SAD calculation, motion vector case using a 16×16 half-pixel approach (as illustrated with reference to FIGS. 5-7), it still takes about 1600 cycles to fetch the reference and current macro-block data, and about another 1200 cycles to perform the initial UCBDS analysis (i.e., assuming 15 SAD computations on average). However, it will only take about 600 cycles to perform the final UCBDS, the 8×8 integer pixel motion vector calculations and the half-pixel motion vector computations. Thus, it will take about 3300 cycles for a macro-block, which means it will take about 14,850,000 cycles (i.e., 3300 cycles per macro-block times 4500 macro-blocks per second) for one second of video (i.e., 14.85 MHz).

For the serial, motion vector case using an 8×8 half-pixel approach (as illustrated with reference to FIG. 4), it takes about 1600 cycles to fetch the reference and current macro-block data. It will take about another 1280 cycles to perform the initial UCBDS analysis (i.e., assuming 16 SAD computations on average). It will take about 320 cycles to perform the final UCBDS (i.e., assuming 4 integer pixel searches). It will take about 900 cycles to perform the 8×8 integer pixel motion vector calculations. It will take 500 cycles to perform the half-pixel motion vector computations for four, 8×8 blocks. Thus, it will take about 4600 cycles for a macro-block, which means it will take about 20,700,000 cycles (i.e., 4600 cycles per macro-block times 4500 macro-blocks per second) for one second of video (i.e., 20.70 MHz).

For the parallelized SAD calculation, motion vector case using an 8×8 half-pixel approach (as illustrated with reference to FIGS. 5-7), it still takes about 1600 cycles to fetch the reference and current macro-block data, and about another 1200 cycles to perform the initial UCBDS analysis (i.e., assuming 15 SAD computations on average). However, it will only take about 600 cycles to perform the final UCBDS, the 8×8 integer pixel motion vector calculations and the half-pixel motion vector computations for four, 8×8 blocks. Thus, it will still take about 3300 cycles for a macro-block, which means it will take about 14,850,000 cycles (i.e., 3300 cycles per macro-block times 4500 macro-blocks per second) for one second of video (i.e., 14.85 MHz).

Thus in the overall system context, the parallelized SAD calculation approach of certain embodiments can get at least a 28% cycle savings over the serial approach. It will be apparent to those skilled in the art that, the parallelized calculation approach uses extra hardware as compared to the serial approach. First, to ensure the pipelining of operations as shown in FIG. 5, there may be a need for the storage of, in the context of the above examples, about 20-25 pixels worth of data at any given time. Second, the parallelized calculation approach may need, again, in the context of the above examples, about 20-25 additional adders to facilitate the simultaneous, pipelined SAD computations. However, this does not mean that additional storage or additional adders must necessarily be designed into the system. Rather, certain embodiments can increase the utilization of already designed-in system storage and system adders.

Although the application has been particularly described with reference to certain embodiments, it should be readily apparent to those of ordinary skill in the art that various changes, modifications, substitutes and deletions are intended within the spirit and scope thereof. Accordingly, it will be appreciated that in numerous instances some features can be employed without a corresponding use of other features. Further, those skilled in the art will understand that variations can be made in the number and arrangement of inventive elements illustrated and described in the above figures. It is intended that the scope of the appended claims include such changes and modifications.

What is claimed is:

1. A method of motion estimation for video coding, said method comprising:

performing a first plurality of comparison calculations between a current block of pixels in a current frame of a video sequence and a first plurality of reference blocks of pixels in a reference frame of said video sequence, wherein said first plurality of reference blocks of pixels are associated with a first plurality of reference locations;

storing results from said first plurality of comparison calculations; and performing, in parallel using at least some of said stored results from said first plurality of comparison calculations, a second plurality of comparison calculations for a second plurality of reference blocks of pixels in said reference frame, wherein said second plurality of reference blocks of pixels are associated with a second plurality of reference locations different from the first plurality of reference locations, and wherein said second plurality of comparison calculations comprise a comparison of said current block of pixels and said second plurality of reference blocks of pixels.

2. The method of claim 1, wherein:
said first plurality of reference locations includes at least two adjacent integer pixel reference locations; and
said second plurality of reference locations includes at least one half-pixel reference location positioned between said at least two adjacent integer pixel reference locations.

3. The method of claim 1, wherein:
said current block of pixels and said first plurality of reference blocks of pixels are said same pixel dimension; and
at least one of said second plurality of reference blocks of pixels is a different pixel dimension than said same pixel dimension of said current block and said first plurality of reference blocks.

4. The method of claim 3, wherein:
said first plurality of reference locations includes at least two adjacent integer pixel reference locations; and
said second plurality of reference locations includes at least one half-pixel reference location positioned between said at least two adjacent integer pixel reference locations.

5. The method of claim 1, wherein said comparison calculations are sum of absolute difference calculations.

6. A method of motion estimation for video coding, said method comprising:
determining a good macro-block integer pixel motion vector location from within a reference frame of a video sequence for a current macro-block of pixels within a current frame of said video sequence;
determining a best macro-block integer pixel motion vector location for said current macro-block;
determining a best sub-block integer pixel motion vector location from within said reference frame for each of a plurality of sub-blocks defined within said current macro-block;
determining whether a macro-block motion vector associated with said best macro-block integer pixel motion vector location is a better motion estimation representation than a plurality of sub-block motion vectors associated with said plurality of sub-block integer pixel motion vector locations; and
determining at least one best half-pixel motion vector location associated with said better motion estimation representation,
wherein at least some portion of all of said steps of determining are performed in parallel with each other and wherein one or more of said steps of determining are based on first and second comparison calculations for a first and second plurality of blocks.

7. The method of claim 6, wherein said reference frame is an immediately previous frame to said current frame of said video sequence.

8. The method of claim 7, wherein said macro-block is 16×16 pixels and each sub-block is 8×8 pixels.

9. The method of claim 8, wherein said macro-block is 16×16 pixels and each sub-block is 8×16 pixels.

10. The method of claim 7, wherein said good macro-block integer pixel motion vector location is selected with an unrestricted center biased diamond search algorithm using sum of absolute difference calculations.

11. The method of claim 7, wherein said best macro-block integer pixel motion vector location is selected by comparing a sum of absolute difference calculation for said good macro-block integer pixel motion vector location to sum of absolute difference calculations for a plurality of integer pixel locations within said reference frame that are adjacent to said good macro-block integer pixel motion vector location.

12. The method of claim 7, wherein said plurality of sub-block integer pixel motion vector locations are each selected by comparing sum of absolute difference calculations.

13. The method of claim 7, wherein said better motion estimation representation is selected by comparing sum of absolute difference calculations between said best macro-block integer pixel motion vector location and said plurality of sub-block integer pixel motion vector locations.

14. The method of claim 10, wherein said best macro-block integer pixel motion vector location is selected by comparing a sum of absolute difference calculation for said good macro-block integer pixel motion vector location to sum of absolute difference calculations for a plurality of integer pixel locations within said reference frame that are adjacent to said good macro-block integer pixel motion vector location.

15. The method of claim 14, wherein said plurality of sub-block integer pixel motion vector locations are each selected by comparing sum of absolute difference calculations.

16. The method of claim 15, wherein said better motion estimation representation is selected by comparing sum of absolute difference calculations between said best macro-block integer pixel motion vector location and said plurality of sub-block integer pixel motion vector locations.

17. The method of claim 16, wherein said macro-block is 16×16 pixels and each sub-block is 8×8 pixels.

18. The method of claim 16, wherein said macro-block is 16×16 pixels and each sub-block is 8×16 pixels.

19. A system comprising:
means for determining a good 16×16 integer pixel motion vector location from within a reference frame of a video sequence for a current 16×16 macro-block of pixels within a current frame of said video sequence;
means for determining a best 16×16 integer pixel motion vector location for said current 16×16 macro-block;
means for determining a best 8×8 integer pixel motion vector location from within said reference frame for each of four 8×8 sub-blocks defined within said current 16×16 macro block;
means for determining whether a 16×16 motion vector associated with said best 16×16 integer pixel motion vector location is a better motion estimation representation than four 8×8 motion vectors associated with said four 8×8 integer pixel motion vector locations; and
means for determining at least one best half-pixel motion vector location associated with said better motion estimation representation,
wherein said at least portions of all of said determining is performed at least partially in parallel with each other and wherein at least a part of said determining is based on first and second comparison calculations for a first and second plurality of blocks.

20. The system of claim 19, wherein said good macro-block integer pixel motion vector location is selected with an unrestricted center biased diamond search algorithm using sum of absolute difference calculations.

21. The system of claim 19, wherein said best macro-block integer pixel motion vector location is selected by comparing a sum of absolute difference calculation for said good macro-block integer pixel motion vector location to sum of absolute difference calculations for a plurality of integer pixel locations within said reference frame that are adjacent to said good macro-block integer pixel motion vector location.

22. The system of claim 19, wherein said plurality of sub-block integer pixel motion vector locations are each selected by comparing sum of absolute difference calculations.

23. The system of claim 19, wherein said better motion estimation representation is selected by comparing sum of absolute difference calculations between said best macro-block integer pixel motion vector location and said plurality of sub-block integer pixel motion vector locations.

24. The system of claim 19, wherein said best macro-block integer pixel motion vector location is selected by comparing a sum of absolute difference calculation for said good macro-block integer pixel motion vector location to sum of absolute difference calculations for a plurality of integer pixel locations within said reference frame that are adjacent to said good macro-block integer pixel motion vector location.

25. The system of claim 24, wherein said plurality of sub-block integer pixel motion vector locations are each selected by comparing sum of absolute difference calculations.

26. The system of claim 25, wherein said better motion estimation representation is selected by comparing sum of absolute difference calculations between said best macro-block integer pixel motion vector location and said plurality of sub-block integer pixel motion vector locations.

27. An apparatus comprising:
means for performing a first plurality of comparison calculations between a current block of pixels in a current frame of a video sequence and a first plurality of reference blocks of pixels in a reference frame of said video sequence, wherein said first plurality of reference blocks of pixels are associated with a first plurality of reference locations;
means for storing results from said plurality of comparison calculations; and
means for performing, in parallel using at least some of said stored results from said plurality of comparison calculations, a second plurality of comparison calculations for a second plurality of reference blocks of pixels in said reference frame, wherein said second plurality of reference blocks of pixels are associated with a second plurality of reference locations different from the first plurality of reference locations, and wherein said second plurality of comparison calculations comprise a comparison of said current block of pixels and said second plurality of reference blocks of pixels.

28. The apparatus of claim 27, wherein:
said first plurality of reference locations includes at least two adjacent integer pixel reference locations; and
said second plurality of reference locations includes at least one half-pixel reference location positioned between said at least two adjacent integer pixel reference locations.

29. The apparatus of claim 27, wherein:
said current block of pixels and said first plurality of reference blocks of pixels are said same pixel dimension; and
at least one of said second plurality of reference blocks of pixels is a different pixel dimension than said same pixel dimension of said current block and said first plurality of reference blocks.

30. The apparatus of claim 29, wherein:
said first plurality of reference locations includes at least two adjacent integer pixel reference locations; and
said second plurality of reference locations includes at least one half-pixel reference location positioned between said at least two adjacent integer pixel reference locations.

31. The apparatus of claim 27, wherein said comparison calculations are sum of absolute difference calculations.

* * * * *